(12) United States Patent
Gao et al.

(10) Patent No.: US 8,069,167 B2
(45) Date of Patent: Nov. 29, 2011

(54) CALCULATING WEB PAGE IMPORTANCE

(75) Inventors: Bin Gao, Beijing (CN); Tie-Yan Liu, Beijing (CN)

(73) Assignee: Microsoft Corp., Redmond, WA (US)

( * ) Notice: Subject to any disclaimer, the term of this patent is extended or adjusted under 35 U.S.C. 154(b) by 336 days.

(21) Appl. No.: 12/413,502

(22) Filed: Mar. 27, 2009

(65) Prior Publication Data

US 2010/0250555 A1  Sep. 30, 2010

(51) Int. Cl.
*G06F 17/30* (2006.01)
(52) U.S. Cl. .......... 707/723; 707/706
(58) Field of Classification Search .......... 707/723
See application file for complete search history.

(56) References Cited

U.S. PATENT DOCUMENTS

| | | |
|---|---|---|
| 2007/0100653 A1 | 5/2007 | Ramer |
| 2008/0114750 A1 | 5/2008 | Saxena |
| 2008/0250009 A1 | 10/2008 | Xie et al. |
| 2008/0270377 A1 | 10/2008 | Liu |
| 2009/0006388 A1 | 1/2009 | Ives |
| 2009/0029687 A1 | 1/2009 | Ramer |

OTHER PUBLICATIONS

Zhang et al., "An Efficient Algorithm to Rank Web Resources," Journal Computer Networks, Jun. 2000.*
Eirinaki et al., "Web Path Recommendations based on Page Ranking and Markov Models," Proceedings of the 7th annual ACM international workshop on Web information and data management, 2005.*
Song et al., "Information Flow Modeling based on Diffusion Rate for Prediction and Ranking," May 2007.*
Berberich, K., M. Vazirgiannis, and G. Weikum, T-Rank: Time-aware authority ranking, Algorithms and Models for the Web-Graph: Third Int'l Workshop, WAW'04, pp. 131-142, Oct. 2004, Springer-Verlag.
Berberich, K., M. Vazirgiannis, and G. Weikum, Time-aware authority ranking, Internet Mathematics, pp. 301-332, vol. 2, No. 3, Apr. 2005, A K Peters Ltd.
Bianchini, M., M. Gori, and F. Scarselli, Inside PageRank, ACM Trans. on Internet Tech., pp. 92-128, vol. 5, No. 1, Feb. 2005, ACM New York, NY, USA.
Boldi, P., M. Santini, and S. Vigna, PageRank as a function of the damping factor, Proc. of the 14th Int'l Conf. on World Wide Web, pp. 557-566, May 2005, ACM New York, NY, USA.
Brin, S., and L. Page, The anatomy of a large-scale hypertextual Web search engine, Comp. Networks and ISDN Systems, pp. 107-117, vol. 30, Apr. 1998.
Dominich, S., PageRank: Quantitative model of interaction information retrieval, Proc. of the 12th Int'l World Wide Web Conf., Int'l Workshop on Mobile Web Technologies WF7, May 2003, pp. 13-18.

(Continued)

*Primary Examiner* — Charles Kim
*Assistant Examiner* — Grace Park
(74) *Attorney, Agent, or Firm* — Lyon & Harr, LLP; Katrina A. Lyon

(57) ABSTRACT

The page ranking technique described herein employs a Markov Skeleton Mirror Process (MSMP), which is a particular case of Markov Skeleton Processes, to model and calculate page importance scores. Given a web graph and its metadata, the technique builds an MSMP model on the web graph. It first estimates the stationary distribution of a EMC and views it as transition probability. It next computes the mean staying time using the metadata. Finally, it calculates the product of transition probability and mean staying time, which is actually the stationary distribution of MSMP. This is regarded as page importance.

20 Claims, 6 Drawing Sheets

OTHER PUBLICATIONS

Gyöngyi, Z., H. Garcia-Molina, and J. Pedersen, Combating web spam with TrustRank, 30th Int'l Conf. on Very Large Data Bases, VLDB '04, pp. 576-587, Jan. 2004, Toronto, Canada.

Haveliwala, T., Efficient computation of PageRank, Technical Report 1999-31, Sep. 1999.

Haveliwala, T., S. Kamvar, and G. Jeh, An analytical comparison of approaches to personalizing PageRank, Stanford University Technical Report, Jul. 2003.

Haveliwala, T. H., Topic-sensitive PageRank, Proceedings of the Eleventh Int'l World Wide Web Conf., Honolulu, Hawaii, May 2002, pp. 517-526, ACM New York, NY, USA.

Hou, Z., Z. Liu, and J. Zou, Markov skeleton processes, Chinese Science Bulletin, vol. 43, No. 11, pp. 881-889, Jun. 1998.

Jindal, A., C. Crutchfield, S. Goel, R. Kolluri, and R. Jain, the mobile web is structurally different, Proc. of the 11th IEEE Global Internet Symposium, Apr. 2008.

Kleinberg, J. M., Authoritative sources in a hyperlinked environment, pp. 668-677, Jan. 1998, Symposium on Discrete Algorithms (SODA), Philadelphia, PA, USA.

Langville, A. N., and C. D. Meyer, Deeper inside PageRank, Internet Mathematics, pp. 335-400, vol. 1, No. 3, Oct. 2004.

Liu, Y., B. Gao, T. Liu, Y. Zhang, Z. Ma, S. He, and H. Li, BrowseRank: Letting users vote for page importance, SIGIR, pp. 451-458, Jul. 2008, ACM New York, NY, USA.

McSherry, F., A uniform approach to accelerated PageRank computation, Proc. of the 14th Int'l Conf. on World Wide Web, pp. 575-582, May 2005, ACM New York, NY, USA.

Morrison, D. S., Jan. 10, 2008, Google algorithm in need of serious overhaul for mobile web?, Retrieved Feb. 3, 2009 from http://moconews.net/article/419-google-algorithm-in-need-of-serious-overhaul-for-mobile-web/.

Page, L., S. Brin, R. Motwani, and T. Winograd, The PageRank citation ranking: Bringing order to the web. Technical report, Stanford Digital Library Technologies Project, Jan. 1998.

Patrick, A., Jul. 25, 2008, Pagerank, Browserrank and the search for Google's achilles heel, retrieved Feb. 3, 2009 from http://www.broadstuff.com/archives/1096-Pagerank,-Browserank-and-the-search-for-Googles-achilles-heel.html, pp. 1-3.

Richardson, M. and P. Domingos, The intelligent surfer: Probabilistic combination of link and content information in PageRank, Advances in Neural Information Processing Sys's, pp. 1441-1448, Dec. 2002, MIT Press.

Yu, P. S., X. Li, and B. Liu, Adding the temporal dimension to search—A case study in publication search, Proc. of the 2005 IEEE/WIC/ACM Int'l Conf. on Web Intelligence, pp. 543-549, Sep. 2005, ACM New York, NY, USA.

Yin, X., W. S. Lee, Optimization of web page for mobile devices, 13th Int'l World Wide Web Conf., pp. 345-354, May 2004, New York, NY.

Yin, X., W. S. Lee, Using link analysis to improve layout on mobile devices, May 2004, http://people.cs.und.edu/~wenchen/reference/adapt/yin.pdf.

* cited by examiner

CALCULATING WEB PAGE IMPORTANCE

Page importance is an important factor for building a web search engine because it plays a key role in crawling, indexing, and ranking of web pages. Many effective algorithms have been proposed to compute page importance. Ranking page importance has particularly been of interest of late as applied to mobile communication devices.

Due to the limitation of bandwidth, screen size, and communication protocols, many websites are designed specifically for mobile devices. These websites (called mobile websites herein) are often directly connected by hyperlinks between them, or indirectly connected by hyperlinks between mobile websites and general websites. The web composed of mobile websites is called the mobile web, and the hyperlink graph of it is called a mobile graph or mobile web graph.

As the mobile web grows larger and larger, a search engine is very useful to help users find information they need and computing page importance is a key factor for any search engine. For the general World Wide Web or web, page importance can be calculated by algorithms such as the well known PageRank algorithm. However, most search algorithms such as PageRank do not work on the mobile web for the structure and properties of the mobile web are very different from those of the general web. The main differences are three fold:
1) The average inlink/outlink number of mobile pages/websites is smaller than that of pages/websites on the general web, and thus the mobile web is much sparser than the general web.
2) There are many more disconnected components on a mobile graph than on a general web graph.
3) Because of the limitation of screen size of mobile devices, usually there are only a few hyperlinks in a page. To maximize profit, commercial websites often point many of these hyperlinks to their partner websites. For example, if a portal website has some commercial contact with a music website, it will point most of the music purchasing links to this partner music website, although there might be several other music websites which are equally as important as the partner music website. Therefore, these links are not preference attachments, but profit oriented attachments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The page ranking technique described herein employs a particular case of a Markov Skeleton Process, to model and calculate page importance scores. In the page ranking technique, a Markov Skeleton Process is employed to model a random walk by a web surfer. In one embodiment of the technique, page importance is viewed as consisting of two factors: reachability and utility. These two factors can be respectively computed as transition probabilities between web pages and mean staying times on web pages in the Markov Skeleton Process. The technique employs a new Markov Skeleton Process herein called a Mirror Semi-Markov Process (MSMP). In two exemplary embodiments the technique is applied to two application tasks: anti-spam on the general web and page importance calculation on a mobile web.

More specifically, in one embodiment, given a web graph and its metadata, the present page ranking technique builds a MSMP model using the web graph. It first estimates the stationary distribution of an Embedded Markov Chain (EMC) associated with the MSMP and views it as transition probability. It next computes the mean staying time using the metadata of the web graph. Finally, it calculates the product of transition probability and mean staying time, which is the stationary distribution of the MSMP. This product is regarded as page importance.

In the following description of embodiments of the disclosure, reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
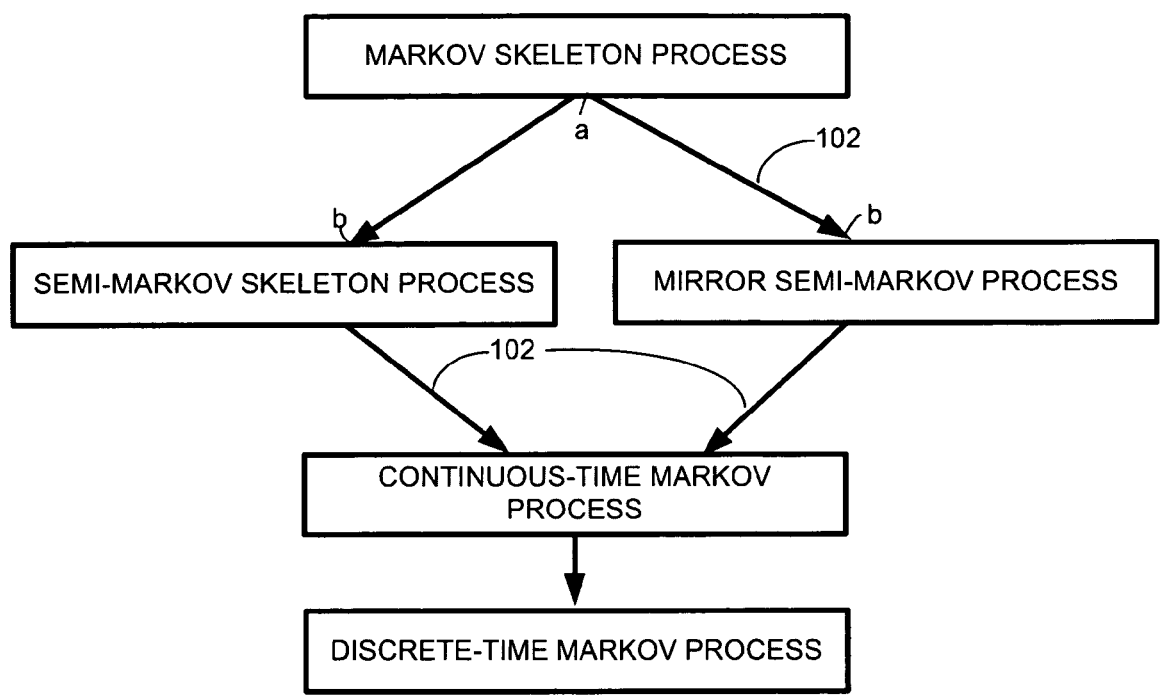
FIG. 1 is an illustration of the relationships between various types of Markov processes.

In the following description of the page ranking technique, reference is made to the accompanying drawings, which form a part thereof, and which show by way of illustration examples by which the page ranking technique described herein may be practiced. It is to be understood that other embodiments may be utilized and structural changes may be made without departing from the scope of the claimed subject matter.

1.0 Page Ranking Technique.

The following paragraphs provide an introduction to the page ranking technique described herein, a description of other page ranking techniques, and an explanation of Markov Skeleton Processes. A description of a framework of the technique, as well as exemplary processes and an exemplary architecture for employing the technique are also provided. Throughout the following description details and associated computations are described.

1.1 Introduction

The page ranking technique described herein employs a novel model to calculate page importance. Page importance is a critical factor for building a web search engine, because it plays a key role in crawling, indexing, and ranking of web pages.

The technique employs a general Markov framework for page importance computations. Specifically, the technique employs a Markov Skeleton Process as a general model to characterize the random walk of a web surfer and to compute page importance scores, assuming that there is a web link graph or a user browsing graph available. In this setting, the importance of a page refers to the value that the page can eventually provide to the random surfer. There are two factors that affect page importance: page reachability and page utility. The former represents the possibility that the surfer arrives at the page and the latter represents the value of the page given to the surfer in a visit. A special type of Markov Skeleton Process, a Mirror Semi-Markov Process, can represent these two factors with transition probability and mean staying time. Specifically, the larger the transition probability to a page is the higher reachability the page has, and the longer mean staying time a page retains the higher utility the page provides. The technique takes the product of transition probability and mean staying time as page importance.

The technique can be employed with existing algorithms such as PageRank and BrowseRank, discussed below. For example, PageRank is based on the Discrete-Time Markov Process which is a special Markov Skeleton Process. BrowseRank is based on Continuous-Time Markov Process, another special Markov Skeleton Process. In a Discrete-Time Markov Process, the page utility of each page is regarded to be the same. Therefore, the stationary distribution of the MSMP (i.e. PageRank) is equal to the stationary distribution of the EMC of MSMP. In a Continuous-Time Markov Process, the page utility of each page can be estimated from samples of user staying time on the page (under an exponential distribution model), while page reachability is the stationary distribution of the EMC of MSMP. On each page, the product of page reachability and page utility is the BrowseRank score of the page.

Theory on Markov Skeleton Processes has been studied in probability theory. A Markov Skeleton Process is a very general stochastic process and it includes most of the Markov models and Semi-Markov models as its special cases. It has been widely used in many fields like queuing theory, reliability engineering, insurance, and economics. The page ranking technique described herein employs a new type of Markov Skeleton Process, called a Mirror Semi-Markov Process to accomplish its tasks. In this process, the staying time of a page depends on both the current page and the previous page visited by the surfer. Thus, the present page ranking technique can deal with the issues that existing algorithms such as PageRank and BrowseRank cannot. For example, for antispam, one embodiment of the technique assumes that the distribution of the staying times varies according to the previous pages visited by the surfer, and thus the technique can create a page importance calculation procedure robust against link spam and click fraud.

1.2 Background: PageRank and BrowseRank

In order to better understand the present page ranking technique, some background into other page ranking techniques is useful. Two popular page ranking methods are PageRank and BrowseRank.

PageRank and its variants compute page importance by taking the web as a graph of pages connected with hyperlinks. The approach makes an assumption that the web link graph is used for the random surfer to carry out random walk. A Discrete-Time Markov Process is employed to model the random walk, and the stationary distribution of the process is used as page importance.

BrowseRank is a recently proposed page ranking method, which computes page importance using user behavior data. Specifically, a user browsing graph is constructed from the web browsing history of users. The browsing graph contains information such as staying times on web pages by users. BrowseRank assumes that the more frequently users click on a page and the longer time the users stay on it, the more likely it is that the page is important. A Continuous-Time Markov Process is employed to model the random walk on the user browsing graph. BrowseRank then takes the stationary distribution of the process as page importance.

1.3 Markov Skeleton Process

As discussed in the introduction, the page ranking technique described herein employs a Markov Skeleton Process (MSP), which is a stochastic process. Markov Skeleton Processes have been proposed and studied in probability theory and applied to many fields including queuing theory and reliability engineering.

A MSP can be described as a stochastic process Z defined as follows. Suppose that X is a Markov Chain with state space S and transition probability matrix P. Let $x_1, x_2, \ldots, x_\tau$, denote a sequence of X, where $x_\tau$, ($\tau=1, 2, \ldots$) is a state. Further suppose that Y is a stochastic process on the positive real-number set $R^+$. Let $y_1, y_2, \ldots, y_\tau, \ldots$ denote a sequence of Y, where $y_\tau$, ($\tau=1, 2, \ldots$) is a positive real-number. Suppose that there are $S'_1, S'_2, \ldots, S'_\tau, \ldots$, and $S'_\tau \subset S$, ($\tau=1, 2, \ldots$). Y is determined by the probability distribution $P(y_\tau | S'_\tau)$, $\tau=1, 2, \ldots$. Z is a Stochastic Process based on X and Y. A sequence of Z can be represented as $$x_1 \xrightarrow{y_1} x_2 \xrightarrow{y_2} \ldots x_\tau \xrightarrow{y_\tau} \ldots \quad (1)$$

where $x_\tau$ denotes a state and $y_\tau$ denotes staying time at state $x_\tau$, ($\tau=1, 2, \ldots$). $x_\tau$ depends on $x_{\tau-1}$ and $y_\tau$ depends on multiple states $S'_\tau$ ($\tau=1, 2, \ldots$).

A MSP is a very general stochastic process. It does not necessarily have a stationary probability distribution. In some of its special cases, however, a stationary distribution exists. Many existing stochastic processes are special cases of a MSP. Below a few examples are listed.

A Semi-Markov Process: when $y_\tau$ only depends on $x_\tau$ and $x_{\tau+1}$, according to distribution $P(y_\tau | x_\tau, x_{\tau+1})$, then Z is called a Semi-Markov Process.

A Continuous-Time Markov Process: when $y_\tau$ only depends on $x_\tau$ following an exponential distribution $P(y_\tau | x_\tau)$, then Z is called a Continuous-Time Markov Process.

A Discrete-Time Markov Process: when $y_\tau$ is constant, then Z is called a Discrete-Time Markov Process.

Furthermore, a Mirror Semi-Markov Process, discussed later and employed by one embodiment of the technique, is also a special case of a MSP. FIG. 1 shows the relationship among the processes described above. In FIG. 1, a directed edge 102 from a to b means that a contains b as its special case.

1.4 General Frame Work of the Page Ranking Technique

In the following paragraphs the key factors for computing page importance are first considered. Then a framework of using a Markov Skeleton Process to represent factors according to the page ranking technique is described.

1.4.1 Page Importance Factors

As discussed previously, the page ranking technique described herein assumes that there is a web surfer performing a random walk on a web graph. By a random walk here a trajectory consisting of successive random steps on the nodes of a web graph is meant. The web graph can be a web link graph or a user browsing graph. In the former, each node in the graph represents a web page, and each edge represents a hyperlink between two pages. In the latter, each node in the graph stands for a web page, and each edge stands for a transition between pages. The transition information can be obtained by aggregating behavior data of billions of web users. In that sense, the random surfer is a 'persona' combining the characteristics of all the web users.

The importance of a page can be viewed as the value that the page provides to the random surfer during his/her entire surfing process. Note that a visit of a page by the surfer is random, and the value which a page can offer to the surfer in one visit is also random. Therefore, there are two factors that can affect page importance:

Page reachability: the (e.g., average) possibility that the surfer arrives at the page.

Page utility: the (e.g., average) value that the page gives to the surfer in a single visit.

Page reachability is mainly determined by the structure of graph. For example, in a web link graph, if a page has a large number of inlinks, it is likely to be more frequently visited. Page utility can be affected by several things, for example, the content of the page or the pages the surfer visited before. That is, page utility may depend on not only the current page but also other related pages.

1.4.2. Modeling Page Importance

A MSP can naturally model the random walk of web surfer. The page ranking technique described herein takes a MSP as the general model for page importance computation, i.e., the framework.

More specifically, suppose that Z is a MSP and (X,Y) are two stochastic processes associated with Z. Let states in the MSP correspond to web pages. The random surfer randomly chooses the next page to visit based on the current page, according to X. He/she further randomly decides the length of staying time on the current page based on the page, and several other pages he/she visited before, and/or several other pages he/she will visit, according to Y. Therefore, the aforementioned two factors are characterized by the two quantities in a MSP. Specifically, Transition probability represents page reachability.

Mean staying time represents page utility.

Furthermore, one can define page importance as the product of transition probability and mean staying time, as done in one embodiment of the present page ranking technique.

A MSP is a very general model, which does not make any specific assumption on the distribution $P(y_\tau | S'_\tau)$. That is, staying time can be assumed to depend on a large number of other states.

1.4.3 Mirror Semi-Markov Process

In the page ranking technique described herein, a new stochastic process called a Mirror Semi-Markov Process (MSMP) is employed. A MSMP can be used in not only in web search but also other applications.

First, the definition of a MSMP is provided:

Definition 1. In a Markov Skeleton Process Z, if Y is a stochastic process for which $y_\tau$ depends only on $x_{\tau-1}$ and $x_\tau$ according to $P(y_\tau | x_{\tau-1}, x_\tau)$, then Z is called a Mirror Semi-Markov Process.

A MSMP is a special case of a Markov Skeleton Process. Furthermore, a MSMP is similar to the Semi-Markov Process described previously. In a Semi-Markov Process, $y_\tau$ depends on the current state $x_\tau$ and the next state $x_{\tau+1}$, while in a MSMP $y_\tau$ depends on the current state $x_\tau$ and the previous state $x_{\tau-1}$. The dependencies are in two opposite directions. That is why the new model employed by the present page ranking technique is called a Mirror Semi-Markov Process.

For a MSMP, there is a Markov Chain associated with it. It is called an Embedded Markov Chain (EMC), as defined below.

Definition 2. The Markov Chain X in a MSMP with transition probability matrix P is called an Embedded Markov Chain (EMC) of a MSMP.

Let $\bar{\pi}$ denote the stationary distribution of EMC X. One has $$\bar{\pi} = \bar{\pi} P. \qquad (2)$$

Here, in one embodiment, $\bar{\pi}$ can be calculated by the power method, a well known method. In one embodiment, the transition probability matrix is computed from the link matrix of the graph. In a link matrix $A = \{a_{ij}\}$ of a graph, aij=1 if there is an edge starting from page i and ending with page j; otherwise, $a_{ij}=0$. To compute the transition probability matrix $P=\{p_{ij}\}$ from A, the technique normalizes each row of A by dividing each element of the row by the sum of the elements in the row, i.e., $p_{ij}=a_{ij}/\{$sum of $a_{i1}, a_{i2}, \ldots, a_{in}\}$, n is the number of pages in the graph. If $\{$sum of $a_{i1}, a_{i2}, \ldots, a_{in}\}$ is zero, then $p_{ij}=1/n$. In this way, P is the transition probability matrix of the graph.

Previously $x_\tau$ and $y_\tau$ were used to represent the state and its corresponding staying time at time $\tau$. Hereafter, in the following description a notation change is made for ease of explanation. The variable j is used to represent a state (j∈S) and $t_j$ is used to represent staying time on state j. Suppose that $p(t_j)$ is the corresponding probability density function on staying time. Then the mean staying time on state j can thus be defined as follows.

$$\tilde{t}_j \triangleq E(t_j) = \int_0^\infty t_j p(t_j) dt_j \qquad (3)$$

The following stationary distribution for a MSMP using $\bar{\pi}$ and $\tilde{t}_j$ is defined as:

$$\pi_j = \frac{\bar{\pi}_j \tilde{t}_j}{\sum_{i=1}^n \bar{\pi}_i \tilde{t}_i}. \qquad (4)$$

The stationary distribution of the EMC represents the visiting or transition probability of a random surfer in a long time period. This transition probability acts as page reachability in some embodiments of the page ranking technique described herein.

The background and an overview of the technique having been provided, the following paragraphs discuss various implementations of the present page ranking technique. An overview of an anti-spam and a mobile web application and computations for exemplary embodiments are also provided.

1.6 Exemplary Processes Employed by the Page Ranking Technique.

Figure 2:
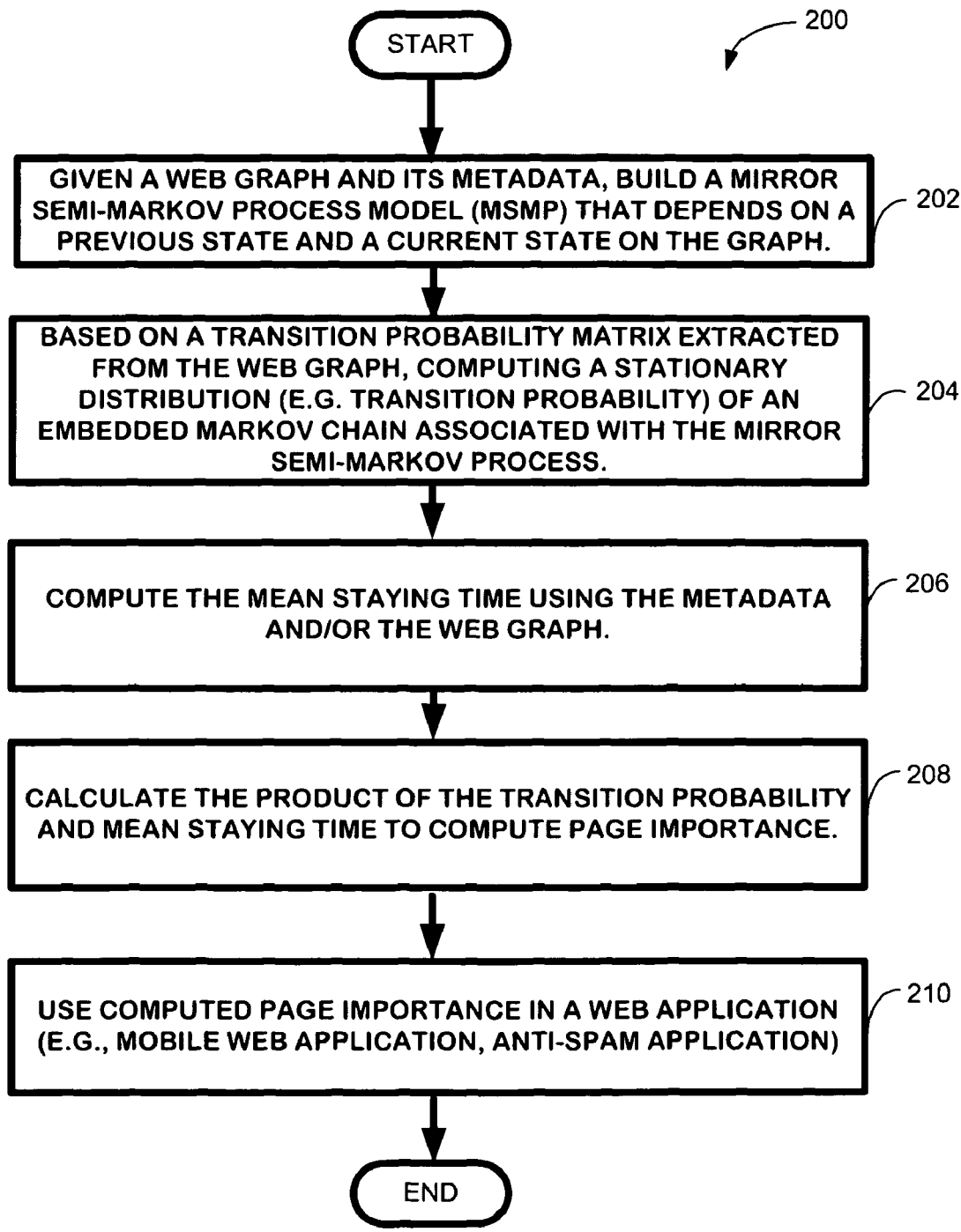
FIG. 2 is a flow diagram depicting an exemplary embodiment of a process for employing the page ranking technique described herein.

An exemplary process 200 employing the page ranking technique is shown in FIG. 2. As shown in FIG. 2, block 202, given a web graph and its associated metadata, a Mirror Semi-Markov Process Model (MSMP) that depends on a previous state and a current state of the web graph is created. (See Table 1 below for an example.) The meta data of a page in a graph can include but not limited to the inlink number, outlink number, observations of user staying time on a page, a tag showing whether the page is a good/important/bad/junk/spam page, last update time of the page, and so on. Based on a transition probability matrix extracted from the web graph, a stationary distribution of an Embedded Markov Chain associated with the MSMP is computed, as shown in block 204. This stationary distribution represents the transition probability or page reachability. The mean staying time is computed using the metadata or the web graph, or both, as shown in block 206. The product of the transition probability and the mean staying time (e.g., the stationary distribution of the MSMP) is then calculated to compute page importance for each of the pages in the web graph. More specifically, for each of the pages in the web graph, the technique calculates the product of the transition probability and the mean staying time, and regards the normalized product (see equation (4)) as the page importance score of the page (block 208). The computed page importance can then be used for various applications, such as for calculating the page importance for a mobile web application, or for an anti-spam application, as previously discussed (block 210).

Figure 3:
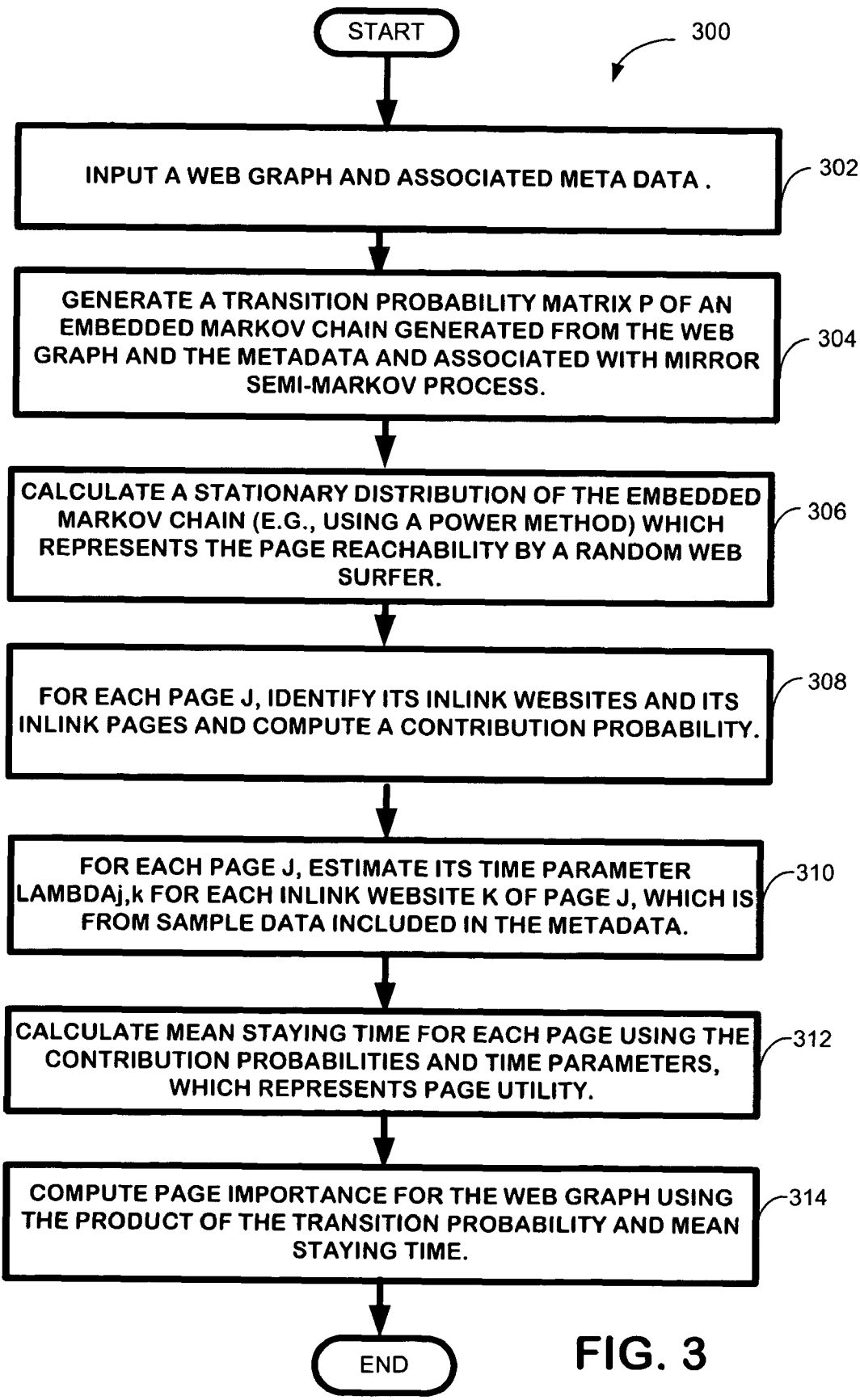
FIG. 3 is a flow diagram depicting another exemplary embodiment of a process for employing the page ranking technique described herein.

Table 1 and FIG. 3 provide a detailed procedure for computing page importance employing a Mirror Semi-Markov Process according to the page ranking technique described herein.

TABLE 1

MSMP Construction Procedure

Input: Web graph and metadata. (block 302 of FIG. 3)
Output: Page importance score π
Procedure:
1. Generate transition probability matrix P of a EMC from the web graph and metadata. (block 304 of FIG. 3)
2. Calculate a stationary distribution $\tilde{\pi}$ of the EMC using a power method (page reachability) (block 306 of FIG. 3)
3. For each page j, identify its inlink websites and its inlink pages, and compute a contribution probability $P(\phi_{jk})$. (block 308 of FIG. 3)
4. For each page j, estimate time parameter $\lambda_{jk}$ from sample data included in the metadata. (block 310 of FIG. 3)
5. Calculate mean staying time $\bar{t}_j$ for each page j with equation (15). (page utility) (block 312 of FIG. 3)
6. Compute page importance for the web graph with equation (4). (page importance) (block 314 of FIG. 3)

An equivalent of the procedure for employing the page ranking technique shown in Table 1 is shown in FIG. 3. As shown in FIG. 3, block 302, a web graph and its associated metadata are input. A transition probability matrix P of an Embedded Markov Chain of a MSMP is generated from the web graph and the metadata is then generated, as shown in block 304. A stationary distribution of the Embedded Markov Chain is then calculated, as shown in block 306. This can be done, for example, by using the well known power method. The stationary distribution of the Embedded Markov Chain represents the transition probability or page reachability by a random web surfer. For each page j of the web graph its inlink websites and its inlink pages are identified and a contribution probability is calculated, as shown in block 308. For each page j, its time parameter is estimated for each inlink website, using the sample data included in the metadata, as shown in block 310. The mean staying time for each page is then calculated, as shown in block 312, using the computed contribution probabilities and time parameters. The page importance for the web graph is then computed using the product of the transition probability and the mean staying time, as shown in block 314.

It should be noted that the mean staying time of a page, as shown in block 312 of FIG. 3, can be calculated as follows. Suppose that for page j there are $n_j$ pages linked to it: $\Xi_j = \{\xi_{j1}, \xi_{j2}, \ldots, \xi_{jn_j}\}$. $p(\xi_{jh})$ is the probability that the surfer comes to page j from page $\xi_{jh}$.

$$\sum_{h=1}^{n_j} p(\xi_{jh}) = 1. \quad (5)$$

Probability $p(\xi_{jh})$ can stand for the contribution of page $\xi_{jh}$ to page j. It is referred to as the contribution probability herein. Note that this probability is a kind of normalized score and it does not necessarily have the interpretation of frequency.

Suppose that the $n_j$ inlinks of page j are from $m_j$ websites, and from website k (k=1, ..., $m_j$) there are $n_{jk}$ inlinks. Thus one has, $$n_j = \sum_{k=1}^{m_j} n_{jk}. \quad (6)$$

Note that the website which page j belongs to might also exist in the $m_j$ websites.

Suppose that the $m_j$ sites that linked to page j are: $\Phi_j = \{\phi_{j1}, \phi_{j2}, \ldots, \phi_{jm_j}\}$. $p(\phi_{jk})$ is the probability that the surfer comes to page j from site k, referred to as construction probability of a site.

$$\sum_{k=1}^{m_j} p(\phi_{jk}) = 1. \quad (7)$$

$$p(\phi_{jk}) = \sum_{l=1}^{n_{jk}} p(\xi_{jl}). \quad (8)$$

Let $t_j$ be the random variable of staying time on page j and $p(t_j)$ be the probability density function on it. One has $$p(t_j) = \sum_{h=1}^{n_j} p(t_j \mid \xi_{jh}) p(\xi_{jh}). \quad (9)$$

Then the mean staying time $\bar{t}_j$ on page j can be calculated as (In practice, if a page does not have any inlinks, then it can be assigned the minimum mean staying time)

$$\bar{t}_j \overset{\Delta}{=} E(t_j) = \int_0^\infty t_j p(t_j) dt_j = \int_0^\infty t_j \sum_{h=1}^{n_j} p(t_j \mid \xi_{jh}) p(\xi_{jh}) dt_j. \quad (10)$$

Here one assumes that staying time $t_j$ follows an exponential distribution in which the parameter is related to both page j and website k $$p(t_j \mid \phi_{jk}) = \lambda_{jk} e^{-\lambda_{jk} t_j}. \quad (11)$$

Furthermore, one assumes $$p(t_j \mid \xi_{jk}) = p(t_j \mid \phi_{jk}), l=1, \ldots, n_{jk}. \quad (12)$$

That is, the staying time depends on page j and the website of inlink k, not the inlink page itself. Combining (6), (8), (9), and (12), one obtains the probability density function of staying time as:

$$p(t_j) = \sum_{h=1}^{n_j} p(t_j \mid \xi_{jh}) p(\xi_{jh}) \qquad (13)$$

$$= \sum_{k=1}^{m_j} \sum_{l=1}^{n_{jk}} p(t_j \mid \xi_{jl}) p(\xi_{jl})$$

$$= \sum_{k=1}^{m_j} p(t_j \mid \phi_{jk}) \sum_{l=1}^{n_{jk}} p(\xi_{jl})$$

$$= \sum_{k=1}^{m_j} p(t_j \mid \phi_{jk}) p(\phi_{jk}).$$

Substituting (11) into (13) yields $$p(t_j) = \sum_{k=1}^{m_j} p(\phi_{jk}) \lambda_{jk} e^{-\lambda_{jk} t_j}. \qquad (14)$$

Thus, one embodiment of the present page ranking technique calculates the mean staying time $\bar{t}_j$ as $$\bar{t}_j = E(t_j) = \int_0^\infty t_j p(t_j) dt_j = \sum_{k=1}^{m_j} \frac{1}{\lambda_{jk}} p(\phi_{jk}). \qquad (15)$$

In the derivation above, one has made two assumptions, namely exponential distribution in equation (11) and page aggregation in equation (12). One can see that equations (14) and (15) represent a specific instantiation of $P(y_\tau \mid x_{\tau-1}, x_\tau)$ in a MSMP. It is assumed that the staying time (utility) of a page is conditioned on the website of inlink page of it and the mean staying time is calculated based on inlink sites. Moreover, one can change the mean staying time through changes of two quantities: $p(\phi_{jk})$ and $\lambda_{jk}$.

Intuitively, the utility of web page does change according to the previous websites visited by the surfer. In the link graph case, if the surfer comes to the current page from a website with high utility (authority, quality, etc), then the utility of the page will also be high. In the user browsing graph case, if the surfer comes to the current page from a website with high utility (popularity, quality, etc.) and following a transition with high frequency, then the utility of the page will also be high. The question then becomes how to calculate the contribution probabilities (shown in block 308 of FIG. 3) from different sites $p(\phi_{jk})$ and to estimate the parameters from different sites $\lambda_{jk}$ (shown in block 310 of FIG. 3). If one has enough observations of staying times, one can estimate the parameters $\lambda_{jk}$, $k=1, \ldots, m_j$. In other cases (insufficient observations or web link graph), one can employ heuristics to calculate mean staying times. For contribution probabilities $p(\phi_{jk})$, one can also use heuristics to calculate them.

The page rank technique described herein can be used in various applications. The paragraphs below describe two such applications. The first one is for anti-spam and the second is for mobile web search. These are shown as examples and are not meant to limit application of the present page ranking technique in any way.

1.6.1.1 Anti-Spam Application

Spam is pervasive on the web and how to effectively eliminate it is an issue one can consider when calculating page importance. One exemplary anti-spam application of the page ranking technique uses a user browsing graph and MSMP. One major advantage of this anti-spam application of the page ranking technique described herein is that it can deal with click fraud.

As explained previously, BrowseRank employs a user browsing graph and Continuous-Time Markov Process. The biggest challenge for this BrowseRank algorithm is click fraud, because it directly estimates the mean staying time from user behavior data. This room for web spammers to conduct click fraud by manually or automatically clicking the pages they want to boost from their websites. As a result, one will observe a large volume of transitions to the spam pages from their websites. A straightforward application of BrowseRank will result in a heavily biased page importance calculation.

One embodiment of the present anti-spam application described herein addresses the click fraud problem by using a MSMP. It calculates the mean staying time of a page on the basis of its inlinked websites. Specifically it partitions the samples of observed staying time according to inlink websites and estimates parameters $\lambda_{jk}$, $(k=1, \ldots, m_j)$. It can use the same method as in BrowseRank to estimates the parameters $\lambda_{jk}$ from partitioned samples. Furthermore, the anti-spam application of the page ranking technique described herein sets the contribution probability $p(\phi_{jk})$, also based on inlink websites, $$p(\phi_{jk}) = \frac{1}{m_j}, (k = 1, \ldots, m_j) \qquad (16)$$

That is, one embodiment of the technique assumes that the contributions from different inlink sites are all equal. Finally, it calculates mean staying time using equation (15). Therefore, if the inlink websites are different, then the mean staying times from them will also differ. An important factor in this anti-spam application is the website normalization of equation (20). Suppose that there are a large number of inlink sites to the page on the user browsing graph, that is, the sites from which users have made transitions to the current page. Click fraud usually has the following behavior patterns: (a) The number of clicks is high and the observed mean staying time is high (in this way, the spammer can cheat BrowseRank-like algorithms in order to maximize their spamming effect); and (b) the visits usually come from a very limited number of websites. (This is because otherwise it will be very costly for the spammer). In one embodiment the present anti-spam application makes effective use of fact (b) and normalizes contributions from different sites.

Note that this is only one simple and example way to calculate mean staying time. Note that a key point is to control the contributions from different sites, and MSMP provides a framework to do it in a principled approach in one embodiment of the present page ranking technique.

1.6.1.2 Mobile Rank Application

One exemplary embodiment of the page ranking technique performs page ranking for a mobile web. It employs a mobile web graph that contains mobile web pages connected with hyperlinks. The mobile web differs largely from the general web in many aspects. For example, the topology of a mobile web graph is significantly dissimilar from that of general web graph. This is because the owners of websites on mobile web tend to create hyperlinks only to their own pages or pages of their business partners. As a result, there are more disconnected components in the mobile web graph. In such cases, the scores computed by algorithms like PageRank may not reflect the true importance of the pages.

Figure 4:
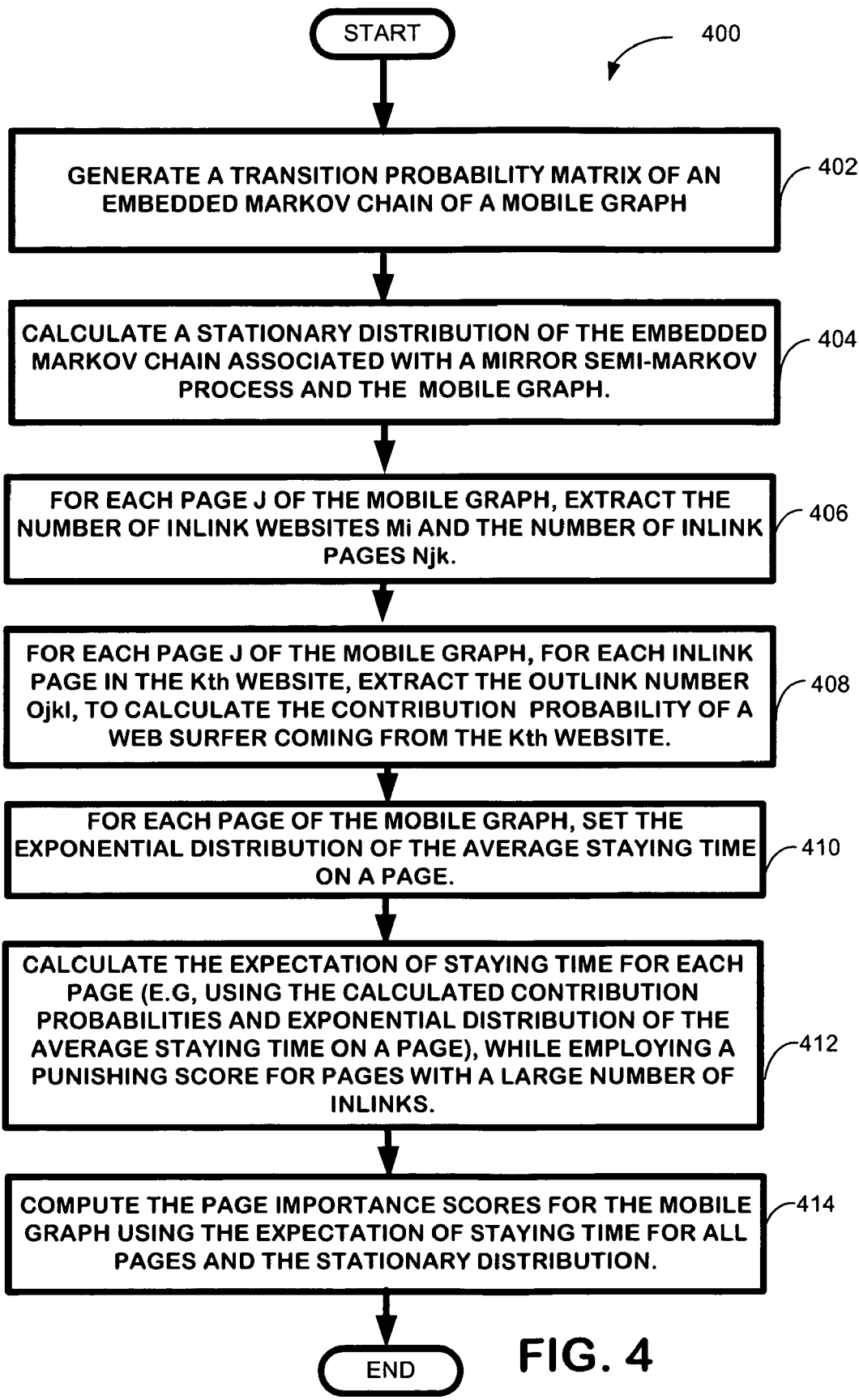
FIG. 4 is yet another flow diagram depicting another exemplary embodiment of a process for employing the page ranking technique for a mobile web application.

More specifically, an exemplary process 400 employing the page ranking technique in a mobile web page ranking application is shown in FIG. 4. As shown in FIG. 4, block 402, a transition probability matrix of an Embedded Markov Chain of a mobile web graph is generated. A stationary distribution of the Embedded Markov Chain of the mobile graph is calculated, as shown in block 404. This again can be interpreted as page reachability. For each page j of the mobile graph, the number of inlink websites and the number in link pages is extracted, as shown in block 406. For each inlink page in the kth website the number of outlinks are extracted to calculate the probability of a web surfer coming from the kth website, as shown in block 408. For each page of the mobile graph, the exponential distribution of the average staying time is set (block 410). The expectation of staying time is calculated for each page, while employing a punishing score for pages with a large number of inlinks, as shown in block 412. The page importance scores for the mobile graph are then computed using the expectation of staying time for all pages and the stationary distribution, as shown in block 414.

Note that in MSMP implementation the technique assumes that staying time depends on not only the current page but also the inlink website. The MSMP has the ability to represent relations between websites and to utilize the information for promoting or demoting staying time (utility) of page. Specifically, if the inlink is from a partner website, then the mobile page ranking technique can demote the staying time of visits from the website.

The contribution probability $p(\phi_{jk})$ (e.g., block 408 of FIG. 4) is defined in the same way as in the anti-spam application. The parameter $\lambda_{jk}$ is heuristically calculated. Suppose that for page j there is an "observed" mean staying time $$\frac{1}{\lambda_j} \cdot \lambda_{jk}$$

is assumed to follow a partnership-based discounting function, or punishing score, $L_{jk}$, $$\frac{1}{\lambda_{jk}} = L_{jk}\left(\frac{1}{\lambda_j}\right). \quad (17)$$

The discounting function or punishing score (e.g., block 412 of FIG. 4) can have different forms for different business relations between websites. For example, in one embodiment the technique uses a Reciprocal Discounting function defined as:

$$L_{jk}(\eta) = \frac{cm_j^2}{n_{jk}}\eta. \quad (18)$$

where c denotes a coefficient.

Therefore, in one embodiment of the page ranking technique described herein the mean staying time in the mobile web page ranking application is calculated as below, $$\tilde{t}_j = \frac{cm_j}{\lambda_j} \sum_{k=1}^{m_j} \frac{1}{n_{jk}}. \quad (19)$$

From equation (19) one can see that: (a) the larger number of inlink websites (i.e., $m_j$), the smaller penalty on the mean staying time; (b) given a fixed number of inlink websites (i.e., $m_j$), the larger number of inlink pages from the $k^{th}$ website (i.e., $n_{jk}$) the larger penalty on the mean staying time by visits from the website. Note that this is only one simple and exemplary way of coping with the partnership problem on a mobile web.

1.7 Exemplary Architecture Employing the Incremental Forum Web Crawling Technique.

Figure 5:
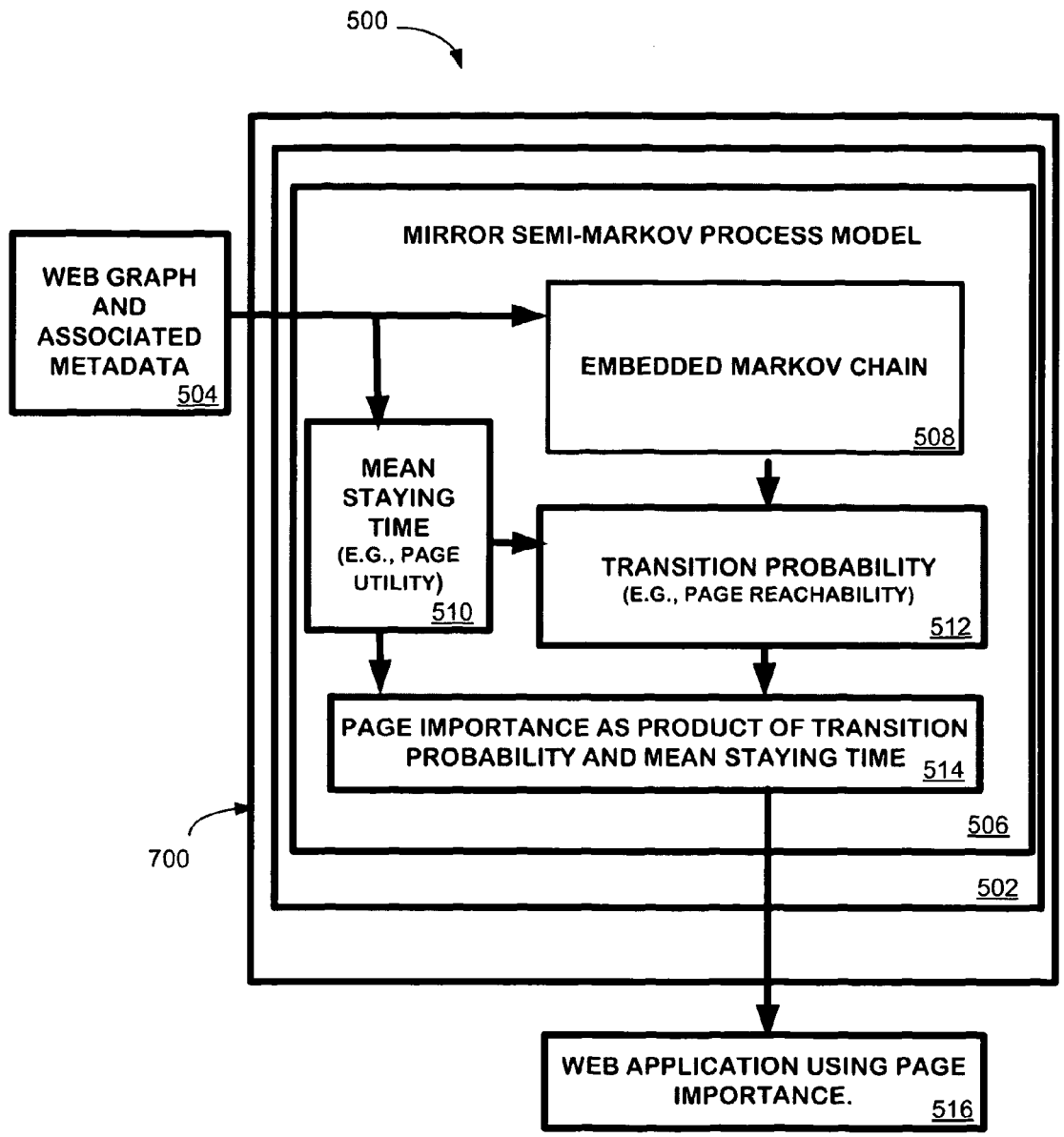
FIG. 5 is an exemplary system architecture in which one embodiment of the page ranking technique can be practiced.

FIG. 5 provides one exemplary architecture 500 in which one embodiment of the page ranking technique can be practiced. As shown in FIG. 5, block 502, the architecture 500 employs a page ranking module 502, which typically resides on a general computing device 600 such as will be discussed in greater detail with respect to FIG. 6. A web graph and associated metadata 504 are input. A Mirror Semi-Markov Process Model (MSMP) 506 that depends on a previous state and a current state of the web graph is created. An Embedded Markov Chain associated with the MSMP and the web graph/associated metadata is computed and this is used to compute transition probability (e.g., page reachability), as shown in blocks 508 and 512. The mean staying time 510 (e.g., page utility) is also computed using the metadata or the web graph. The product of the transition probability and the mean staying time is then calculated to compute page importance (block 514) of the pages in the web graph. The computed page importance can then be used for various applications, such as, for example, for calculating the page importance for a mobile web application, or for an anti-spam application, as previously discussed (block 516).

2.0 The Computing Environment

The page ranking technique is designed to operate in a computing environment. The following description is intended to provide a brief, general description of a suitable computing environment in which the page ranking technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 6:
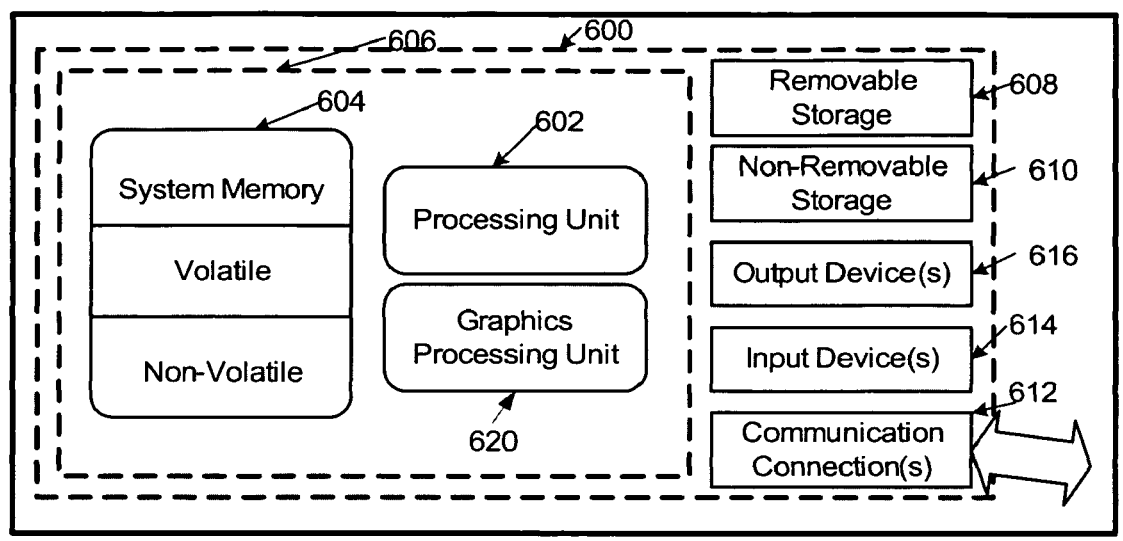
FIG. 6 is a schematic of an exemplary computing device which can be used to practice the page ranking technique.

FIG. 6 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 6, an exemplary system for implementing the page ranking technique includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. Additionally, device 600 may also have additional features/functionality. For example, device 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 600. Any such computer storage media may be part of device 600.

Device 600 also contains communications connection(s) 612 that allow the device to communicate with other devices and networks. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 600 may have various input device(s) 614 such as a display, a keyboard, mouse, pen, camera, touch input device, and so on. Output device(s) 616 such as speakers, a printer, and so on may also be included. All of these devices are well known in the art and need not be discussed at length here.

The page ranking technique may be described in the general context of computer-executable instructions, such as program modules, being executed by a computing device. Generally, program modules include routines, programs, objects, components, data structures, and so on, that perform particular tasks or implement particular abstract data types. The page ranking technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

Wherefore, what is claimed is:

1. A computer-implemented process for calculating page importance of a page on a mobile website, comprising:
   inputting a web graph and its associated metadata;
   building a Mirror Semi-Markov Process Model (MSMP) using the input web graph;
   based on a transition probability matrix extracted from the web graph, computing a stationary distribution of an Embedded Markov Chain associated with the MSMP;
   computing a mean staying time of a random web surfer on a web page; and
   calculating a product of the transition probability and mean staying time as the page importance.

2. The computer-implemented process of claim 1, wherein the Mirror Semi-Markov Process Model depends on a previous state and a current state of web graph.

3. The computer-implemented process of claim 1, further comprising computing the mean staying time using the metadata associated with the web graph.

4. The computer-implemented process of claim 1, further comprising computing the mean staying time using the web graph.

5. The computer-implemented process of claim 1, further comprising using the computed page importance in a mobile web application.

6. The computer-implemented process of claim 1, further comprising using the computed page importance in an anti-spam application.

7. The computer-implemented process of claim 6, wherein a distribution of staying times varies according to previous pages visited by a random surfer traversing the web graph.

8. A computer-implemented process for calculating page importance of a page on a mobile website, comprising, using a computer for,
   generating a transition probability matrix of an Embedded Markov Chain associated with a Mirror Semi-Markov Process and a mobile graph;
   calculating a stationary distribution of the Embedded Markov Chain;
   for each page j of the mobile graph, extracting the number of inlink websites $m_j$ and the number of inlink pages, $n_{jk}$;
   for each inlink page in the kth website of the mobile graph, extracting the outlink number $o_{jkl}$, to compute a contribution probability of a web surfer coming from the kth website;
   for each page of the mobile website, setting the exponential distribution of the average staying time on a page;
   calculating the expectation of staying time for each page using the calculated contribution probabilities and exponential distribution of the average staying time;
   computing the page importance scores for the mobile graph using the expectation of staying time for all pages and the stationary distribution.

9. The computer-implemented process of claim 8 further comprising computing the expectation of staying time for each page, while employing a punishing score for pages with a large number of inlinks from a website.

10. The computer-implemented process of claim 9 wherein the punishing score for pages with a large number of inlinks from a website is computing using a Reciprocal Discounting Function.

11. A system for determining web page importance, comprising:
- a general purpose computing device;
- a computer program comprising program modules executable by the general purpose computing device, wherein the computing device is directed by the program modules of the computer program to,
- input a web graph and associated metadata;
- create a Mirror Semi-Markov Process Model (MSMP) that depends on a previous state and a current state of the web graph;
- compute an Embedded Markov Chain associated with the web graph and associated meta data;
- using the Embedded Markov Chain to compute a transition probability;
- computing a mean staying time using the metadata or the web graph;
- computing the page importance as the product of the transition probability and the mean staying time.

12. The system of claim 11, wherein calculating the page importance is computed for a mobile web application.

13. The system of claim 11, wherein the page importance is computed for an anti-spam application.

14. The system of claim 11, wherein the web graph is a web link graph, and wherein each node in the graph represents a web page and each edge represents a hyperlink between two web pages.

15. The system of claim 11, wherein the web graph is a user browsing graph, and wherein each node in the graph represents a web page and each edge represents a transition between two web pages.

16. The system of claim 11, wherein the transition probability represents page reachability by a random web surfer, and wherein mean staying time represents page utility to a random web surfer.

17. The system of claim 11, further comprising obtaining mean staying times by observing the mean staying times of many random web surfers.

18. The system of claim 11, wherein in the MSMP depends on a previous state and a current state of web graph.

19. The system of claim 11, wherein for a large number of inlinks coming from a given website, staying time for this website is discounted.

20. The system of claim 11 further comprising normalizing the number of inlinks from all websites when computing mean staying time.

* * * * *